(12) United States Patent
Chapman et al.

(10) Patent No.: US 6,473,250 B1
(45) Date of Patent: Oct. 29, 2002

(54) BEAM DEFLECTOR

(75) Inventors: Mark A V Chapman, Wotton-under-Edge (GB); Tingdi Liao, Wotton-under-Edge (GB)

(73) Assignee: Renishaw PLC, Gloucestershire (GB)

( * ) Notice: Subject to any disclaimer, the term of this patent is extended or adjusted under 35 U.S.C. 154(b) by 0 days.

(21) Appl. No.: 09/380,703

(22) PCT Filed: Jan. 21, 1999

(86) PCT No.: PCT/GB99/00048

§ 371 (c)(1),
(2), (4) Date: Sep. 15, 1999

(87) PCT Pub. No.: WO99/38045

PCT Pub. Date: Jul. 29, 1999

(30) Foreign Application Priority Data

Jan. 21, 1998 (GB) .............................................. 9801197
Jan. 22, 1998 (GB) .............................................. 9801292

(51) Int. Cl.[7] .................................................. G02B 5/04
(52) U.S. Cl. ........................ 359/837; 359/831; 359/669
(58) Field of Search ................................ 359/669, 670, 359/831, 837

(56) References Cited

U.S. PATENT DOCUMENTS

| | | | |
|---|---|---|---|
| 2,023,217 A | * | 12/1935 | Benford |
| 2,767,629 A | * | 10/1956 | Millet |
| 2,780,140 A | * | 2/1957 | Luboshez |
| 2,810,323 A | * | 10/1957 | Coleman |
| 2,816,480 A | * | 12/1957 | Tushinsky et al. |
| 2,975,668 A | * | 3/1961 | Eckel |
| 3,034,398 A | * | 5/1962 | Barnes |
| 3,497,289 A | * | 2/1970 | Oberheuser |
| 4,059,343 A | * | 11/1977 | Kowalski et al. |
| 4,580,879 A | * | 4/1986 | Wilson |
| 4,850,686 A | | 7/1989 | Moriomoto et al. |
| 5,461,513 A | * | 10/1995 | Maruyama |

FOREIGN PATENT DOCUMENTS

| | | | |
|---|---|---|---|
| DE | 1 260 818 | | 2/1968 |
| DE | 1283555 | * | 11/1968 |
| GB | 2 200 223 A | | 7/1988 |
| IT | 591743 | * | 4/1959 |

* cited by examiner

*Primary Examiner*—Ricky D. Shafer
(74) *Attorney, Agent, or Firm*—Oliff & Berridge, PLC

(57) ABSTRACT

A beam deflector has first and second wedge prisms having refractive indices and geometries which are similar (in the case of the geometry to within arc minutes). The prisms are rotatable about an optical axis O defined by the direction of propagation of the incident light beam, to adjust the angle through which the incident beam is deflected. A third prism has a wedge angle which is greater than that of the first and second prisms by a factor of √2. When the directions in which the first and second prisms refract the beam away from the optical axis are aligned about the optical axis at notional angles of 0° and 90° respectively, and the third prism is aligned with its direction of refractive deviation at a notional angle of 225° about the optical axis, the light beam will pass undeviated through the deflecting device. The provision of the third prism ameliorates the need to match closely the geometries and refractive indices of the first and second prisms, and yet avoids the occurrence of angles through which the beam may not be deflected as a result of insufficiently closely matched prisms.

13 Claims, 2 Drawing Sheets

BEAM DEFLECTOR

The present invention relates to an optical device for deflecting a light beam, such as a laser beam for example.

A known beam deflector comprises a pair of wedge prisms positioned in the path of an incident beam of light, whose direction of propagation defines an optical axis. By virtue of refraction of the light beam upon passage through the prisms, each of the wedge prisms deflects the light beam in a direction transverse to the optical axis. When the prisms are mutually adjacent, and so aligned that the directions in which they deflect the light are parallel and mutually opposing, the light beam will pass through the prisms substantially undeviated. Relative rotation of the prisms about the optical axis will result in a net deviation of the light beam, whose magnitude depends upon the magnitude of the aforementioned relative rotation. The rotational displacement of the direction of any deviation of the light beam about the optical axis may be adjusted by a simultaneous rotation of the two wedge prisms once the relative rotation has been accomplished. Wedge prisms of this type must have very closely matched refractive indices, and substantially identical geometry (to within arc seconds) in order to ensure that the resulting beam deflector does not have a blind spot i.e. a given angle of deflection (or, more commonly the undeviated transmission of a light beam through the beam deflector) which is unattainable as a result of the prisms not being adequately matched.

The present invention seeks to ameliorate the difficulty and/or expense of producing two such closely matched prisms, and provides, according to a first aspect, a device for deflecting a light beam having a direction of incident propagation which defines an optical axis, the device being adapted to deflect the light beam away from the optical axis and along a deflected axis which is non-parallel to the optical axis, the device comprising first, second and third optical elements situated in the beam path, at least two of which are rotatable relative to the light beam to adjust deflection of the beam, wherein the geometry and refractive index of the optical elements is such that deflection of the light beam is adjustable throughout a predetermined solid angle about the optical axis.

Preferably the first and second optical elements have substantially similar geometries and refractive indices, and interact with the light beam to deflect the beam away from the optical axis in first and second directions of refractive deviation respectively, and the third optical element which interact with the light beam to deflect the beam away from the optical axis in a third direction of refractive deviation, wherein the geometry and refractive index of the third optical element relative to the geometry and refractive index of the first and second optical elements is such that: when the first and second optical elements are aligned about the optical axis such that the first and second directions of refractive deviation extend at notional angles of 0° and $\alpha°$ respectively, the third direction of refractive deviation extends at a notional angle of $[180+(\alpha°/2)]$, and the first second and third directions of refractive deviation are orthogonal to the optical axis, the light beam passes through the device with its path substantially undeviated, and wherein the first and second optical elements are rotatable relative to the optical axis to adjust deflection of the light beam.

The requisite refractive characteristics of the third optical element relative to those of the first and second optical elements may be attained by virtue of a geometry which differs from that of the first and second elements, or by virtue of a refractive index which differs from that of the first and second optical elements, or by virtue of a combination of a variation in both parameters.

An embodiment of the present invention will now be described, by way of example, and with reference to the accompanying drawings in which.

Figure 1:
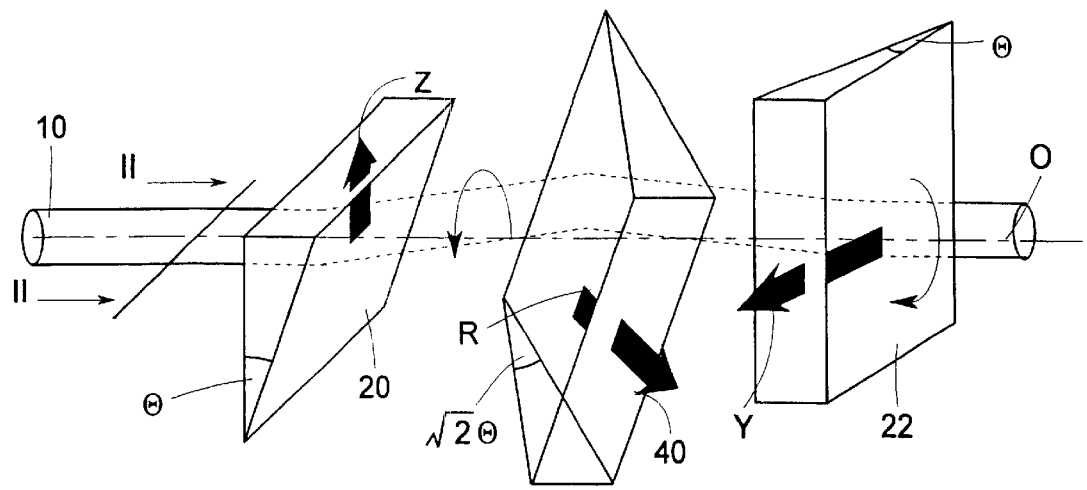
FIG. 1 is a perspective schematic view of a beam deflector according to the present invention.
Figure 2:
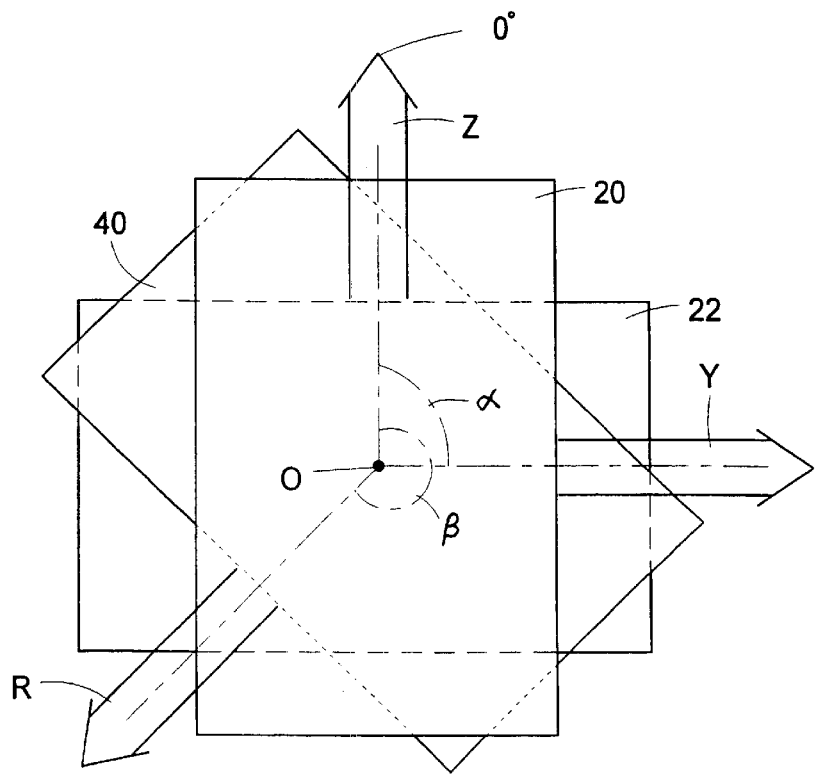
FIG. 2 is an elevation on the line II—II in FIG. 1.

Referring now to FIG. 1, a substantially collimated light beam 10 propagates along an optical axis O. The beam 10 is incident upon a beam deflecting device which includes first and second wedge prisms 20,22. Wedge prism 20 has a refractive effect on the propagating laser light such that it will deflect the beam by refraction away from the optical axis O in a direction of refractive deviation illustrated in FIG. 1 as the Z direction. Wedge prism 22 is aligned about the optical axis O with its direction of refractive deviation at α 90° to the Z direction, illustrated in FIG. 1 as the Y direction. A third intermediate wedge prism 40, is situated interstitial the wedge prisms 20,22, and the direction of refractive deviation R of this wedge prism is substantially at 225° relative to the notional 0° angle of the Z direction. The prism 40 is conveniently situated between prisms 20,22, but may equally be located first or third in the beam path. In this example all three prisms 20,22,40 are made of the same refractive material, and have the same refractive index. With these conditions the geometry of the prisms is typically such that both the first and second wedge prisms 20,22 will have wedge angles θ, which are similar to within approximately 5 arc minutes, while the interstitial wedge prism 40 will have a wedge angle equal to $\theta\sqrt{2}$ (for small angle approximations). Alternatively, the prisms 20,22,40 may have substantially similar geometries, and the interstitial prism 40 has a refractive index which is $\sqrt{2}$ greater than the refractive index of the prisms 20,22 to achieve the same result. In a further alternative the prism 40 may have a greater wedge angle and a greater refractive index, such that from the combination of these characteristics same refractive effect is obtained. With such a 3 prism arrangement having these characteristics, when the prisms 20,22 are aligned about the optical axis O with their direction of refractive deviation Z, Y at notional angles of 0° and 90°, and prism 40 aligned with its direction of refractive deviation at 225°, the incident light beam passes through the deflecting device undeviated.

Figure 3:
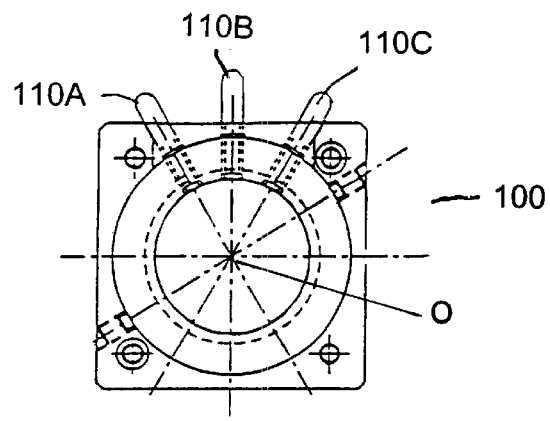
FIG. 3 is a side elevation of the beam deflecting elements of FIGS. 1 and 2 incorporated in a housing.

Rotation of one or more of the prisms 20,22,40 will enable the beam to be steered to a desired angle of deflection. Referring now to FIG. 3, the prisms are preferably provided within a single housing 100, with each of the prisms 20,22,40 being connected to a steering handle 110, ABC respectively, to enable adjustment of their angle of refractive deviation relative to the incoming beam and/or each other (although it is only necessary for the prisms 20 and 22 to be rotatable). Rotation of the prisms alters the angle to which the incident light beam is deflected upon passage through the device in order to steer the beam in a desired direction. The provision of the intermediate prism 40 eliminates the possibility of blind spots due to insufficient matching of the refractive indices and the geometry of the first and second wedge prisms 20,22.

Figure 4:
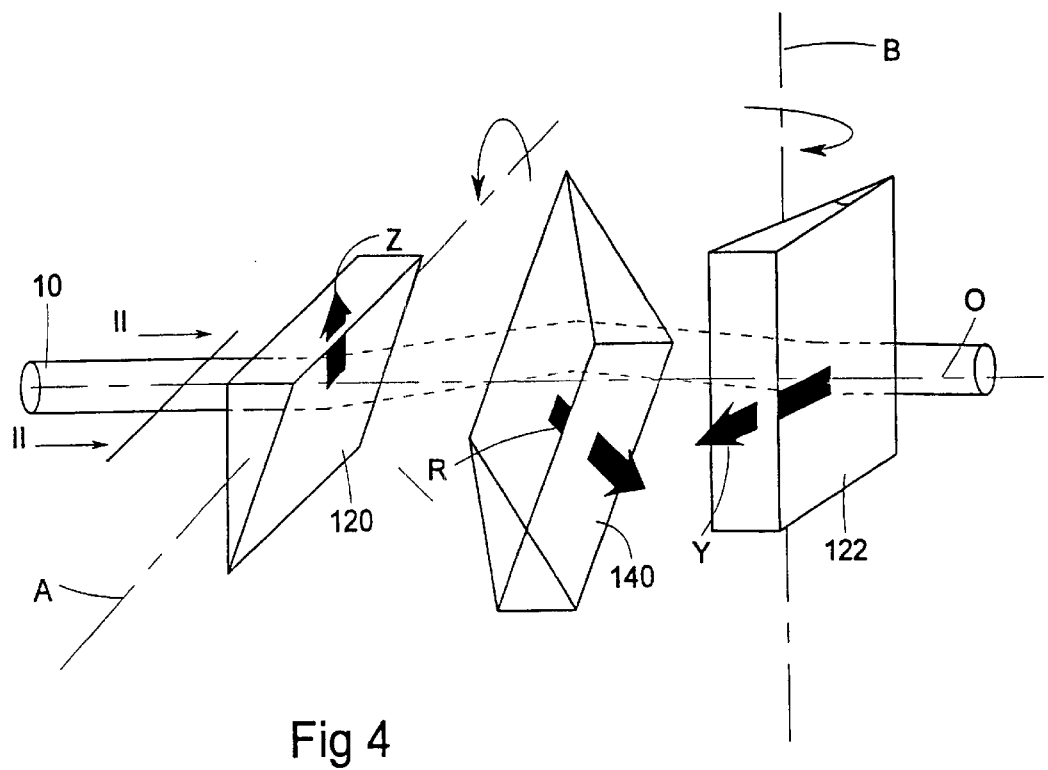
FIG. 4 is perspective schematic view of a second embodiment of beam deflector.

Referring now to FIG. 4, an alternative configuration of beam deflector has first and second wedge prisms 120,122 aligned about the optical axis O with their directions of refractive deviation Z,Y at notional angles of 0° and 90° respectively, and a third prism 140 aligned with its direction of refractive deviation R at 225°. The relative geometries/refractive indices of the prisms 120,122 and the prism 140 are as described in the first embodiment for prism 20,22,40 respectively. The prisms 120,122 are rotatable about alignment axes A,B respectively, which lie in a plane orthogonal to the optical axis.

When the prisms 120,122 are aligned such that their directions of refractive deviation lie in the plane orthogonal to the optical axis (as does the direction of refractive deviation of prism 140) the incident light beam passes through the deflecting device undeviated. Rotation of the prisms 120,122 about the alignment axes A,B, which lie in a plane orthogonal to the optical axis O, and are orthogonal to the respective directions of refractive deviation Z,Y, alters the extent of refraction which the light beam propagating through the deflecting device undergoes at the respective prism, and thus the angle through which the beam is deflected as a result of its passage through the device.

In all of the illustrated examples the geometry of the optical elements (or their relative refractive index, or combination of refractive index and wedge angle to achieve the requisite refractive power, as discussed above) and the relative orientation of their directions of refractive deviation is based on the passage of an undeviated beam when the prisms 20,22;120,122 are arranged with their directions of refractive deviation orthogonal to each other; the prism 40;140 is thus aligned with its direction of refractive deviation at an angle of 225°, and, for prisms of the same refractive index, has a wedge angle of $\sqrt{2}$ greater than the wedge angle of the prisms 20,22;120,122 (or for prisms of the same geometry, a refractive index of $\sqrt{2}$ greater than that of the prisms 20,22;120,122). Other geometries of alignment and relative wedge angle (and therefore correspondingly, relative refractive index, or combination of both geometry and refractive index) are however possible.

For example the prisms 20,22;120,122 could be aligned at notional angles of 0° and 60°, and the prism 40;140 aligned at a notional angle of 210°. In this example the wedge angle of the prism 40;140 is $\sqrt{3}$ greater than that of prisms 20,22;120,122 when all three prisms have the same refractive index; or, if all three prisms have the same wedge angle, the refractive index of the prism 40;140 would have to be $\sqrt{3}$ greater than that of the prisms 20,22;120,122. Again, combination of a greater wedge angle and a greater refractive index for the prism 40;140 are possible to achieve the same relative refractive power.

Generically, the relationship between the directions of refractive deviation of the prisms 20,22;120,122 and 40;140 for the passage of an undeviated beam is:

$$\beta = 180° + \alpha/2$$

where:

β is the angle of orientation of the direction of refractive deviation of the prism 40;140 as measured from a notional zero degree angle;

α is the angle of orientation of the direction of refractive deviation of the prism 22;122, as measured from the notional zero angle; and the notional zero angle is defined by the orientation of the direction of refractive deviation of the prism 20;120;

and the generic relationship of the relative wedge angles or refractive indices (given similar refractive indices and wedge angles respectively) is given (assuming small angle approximations) by the relationship:

$$\phi = 2\theta \cos(\alpha/2)$$

where:

φ is the wedge angle/refractive index of the prism 40;140; and

θ is the wedge angle/refractive index of the prisms 20,22;120,122.

As mentioned above, this equation holds true for small wedge angles where sine θ is ≈ to θ. However, where the angles involved exceed the small angle approximation, second and higher order terms of the polynomial expansion of since θ should be included as appropriate.

Where the expression is used to evaluate the relative refractive indices required, it is once again appropriate only where the wedge angles of the first, second and third prisms are small angles. Where the wedge angles exceed the small angle approximation, higher order polynomial terms should again be included.

Although the present invention has been exemplified with reference to three independent optical elements mounted together (as in FIG. 3), or in close proximity, this is not necessary in order to accrue the benefits of the present invention. For example, the third prism 40;140 may be combined with other optical elements in a system, such as a polarising cubic beamsplitter in a laser interferometer system, while the first and second prisms (for example) may be mounted separately and remote from the third prism.

What is claimed is:

1. A device for deflecting a light beam, comprising:

three separate optical elements mounted on an axis, each of the optical elements including two convergent plane surfaces which define a wedge angle and through which the light beam passes, wherein two of the optical elements have similar wedge angles and refractive indices, and at least one of a refractive index and a wedge angle of the third optical element is respectively greater than that of either of the first and second optical elements, wherein at least two of the optical elements are mounted for independent rotation relative to the axis with their directions of refractive deviation extending in non-parallel directions whereby the beam is adjustable in a desired direction within a predetermined solid angle by rotation of one or more of the optical elements relative to the axis.

2. A device according to claim 1, wherein:

a) a first and a second optical elements of the three optical elements are independently rotatable relative to the axis, b) a third optical element of the three optical elements is mounted in a fixed relationship about the axis, and c) a direction of refractive deviation of the third optical element is opposite to a mean of the angles of refractive deviation of the first and the second optical elements, whereby a path of the light beam is adjustable so that it passes through the device substantially undeviated.

3. A device according to claim 2, wherein the first and the second optical elements are independently rotatable about the axis.

4. A device according to claim 3, wherein a first, a second, and a third direction of refractive deviation corresponding to a first prism, a second prism, and a third prism, respectively, are orthogonal to the axis.

5. A device according to claim 2, wherein the first and the second optical elements are rotatable about a first and a second alignment axes, respectively, and which lie in planes orthogonal to the axis.

6. A device according to claim 5, wherein said alignment axes are additionally orthogonal to a first direction of refractive deviation of the first prism and to a second direction of refractive deviation of the second prism, respectively.

7. A device according to claim 2, wherein the first, the second, and the third optical elements are a first prism, a second prism, and a third prism, respectively, and the first, the second, and the third prisms are made of similar refractive material, wherein the third prism has a wedge angle substantially equal to:

$$2\theta \cos(\alpha/2),$$

where $\theta$ is a wedge angle of the first and the second prisms, and $\alpha$ is a notional angle, which is the angle between the two directions of refractive deviation of the two rotatable prisms.

8. A device according to claim 2, wherein the first, the second, and the third optical elements are a first prism, a second prism, and a third prism, respectively, and the first, the second, and the third prisms have similar wedge angles, wherein a refractive index of the third prism is equal to:

$$2n \cos(\alpha/2),$$

where n is a refractive index of the first and the second prisms, and $\alpha$ is a notional angle, which is the angle between the two directions of refractive deviation of the two rotatable prisms.

9. A device according to claim 2, wherein the first, the second, and the third optical elements are a first prism, a second prism, and a third prism, respectively, and the third prism has:
- a wedge angle greater than that of the first and the second prisms; and
- a refractive index greater than that of the first and the second prisms, such that a refractive effect which the third prism has on the light beam in comparison to a refractive effect of the first or the second prisms on said light beam is equivalent to a prism having a relative wedge angle defined as:

$$2\theta \cos(\alpha/2),$$

where $\theta$ is a wedge angle of the prism, and $\alpha$ is a notional angle, which is the angle between the two directions of refractive deviation of the two rotatable prisms.

10. A device according to claim 9, wherein the refractive effect which the third prism has on the light beam in comparison to a refractive effect of the first or the second prisms on said light beam is equivalent to a prism having a relative refractive index defined as:

$$2n \cos(\alpha/2),$$

where n is a refractive index of the prism, and $\alpha$ is a notional angle.

11. A device according to claim 2, wherein the first, second, and third optical elements are a first prism, a second prism, and a third prism, respectively, and the third prism has a wedge angle greater than that of a wedge angle of the first and the second prisms and a refractive index greater than that of a refractive index of the first and the second prisms, such that a refractive effect which the third prism has on the light beam in comparison to a refractive effect of the first and the second prisms on said light beam is equivalent to a prism having a relative wedge angle substantially equal to:

$$2\theta \cos(\alpha/2),$$

where $\theta$ is a wedge angle of the first and second prisms, and $\alpha$ is a notional angle; or a refractive index equal to:

$$2n \cos(\alpha/2),$$

where n is the refractive index of the first and second prisms.

12. A device according to claim 1, wherein rotation of a first one of the optical elements deflects the beam away from the axis in a first direction, and rotation of the second one of the optical elements deflects the beam away from the axis in a second direction which is non-parallel to the first direction.

13. A device according to claim 1, wherein the directions of refractive deviation of said at least two optical elements are orthogonal.

* * * * *